UNITED STATES PATENT OFFICE.

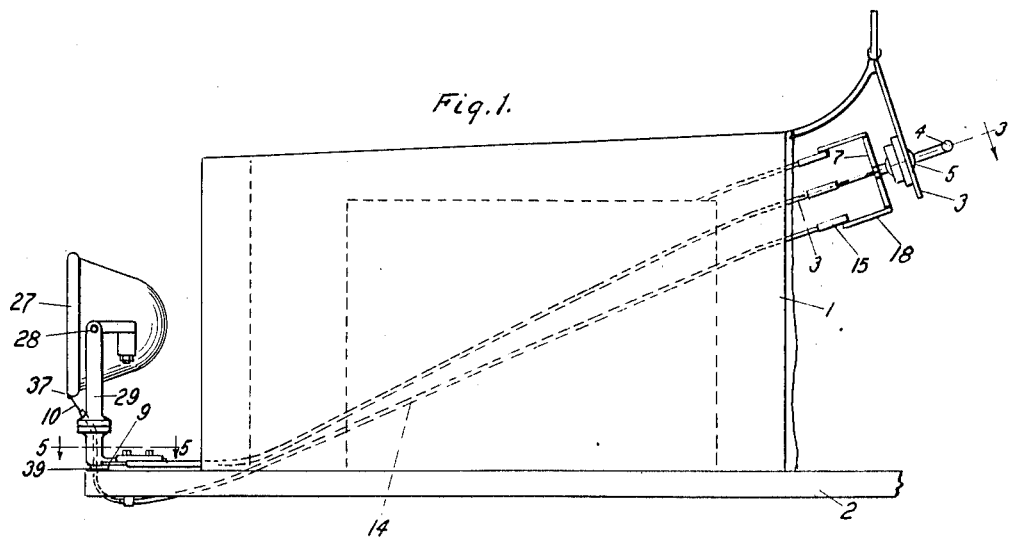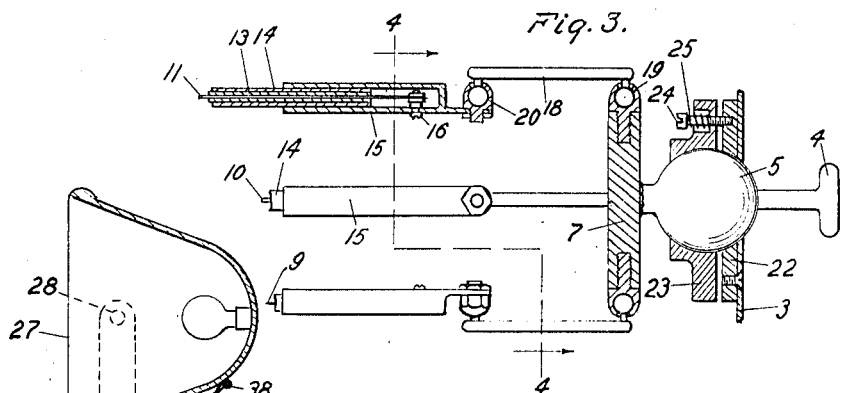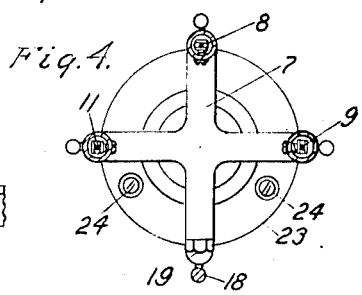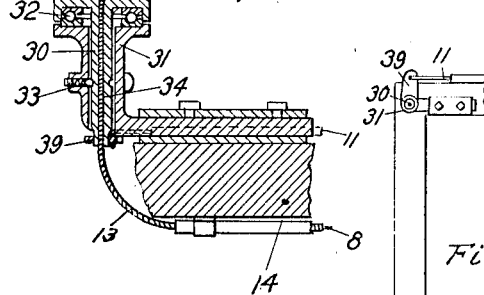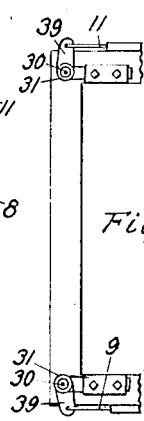

EDWARD JESURUN, OF PALO ALTO, AND ROWLAND LYTTLE, OF LOS ANGELES, CALIFORNIA.

UNIVERSAL DIRECTION CONTROL FOR VEHICLE-HEADLIGHTS.

1,270,163.　　　　　Specification of Letters Patent.　　Patented June 18, 1918.

Application filed May 17, 1917. Serial No. 169,175.

*To all whom it may concern:*

Be it known that we, EDWARD JESURUN, a citizen of the United States, residing at Palo Alto, in the county of Santa Clara and State of California, and ROWLAND LYTTLE, a citizen of the United States, residing at Los Angeles, in the county of Los Angeles and State of California, have invented a new and useful Universal Direction Control for Vehicle-Headlights, of which the following is a specification.

This invention relates to means for controlling the direction in which vehicle headlights are presented, so as to provide for swinging the same from side to side or up and down according to the manner in which it is desired to throw the light therefrom.

The main object of the present invention is to provide means for accomplishing this result which will be simple in construction and effective in operation.

The accompanying drawing illustrates an embodiment of our invention and referring thereto:
Figure 1 is a side elevation of the apparatus in position on the vehicle, only so much of the vehicle being shown as is necessary to show the mounting of the apparatus constituting the invention.
Fig. 2 is a vertical section of the supporting means for one of the headlights.

Fig. 3 is a section on line 3—3 in Fig. 1.
Fig. 4 is a section on line 4—4 in Fig. 3.
Fig. 5 is a section on line 5—5 in Fig. 1.
In Fig. 1 of the drawing the hood of the motor vehicle is indicated at 1, and a portion of the frame thereof at 2. Suitably mounted at the rear of the hood, for example, on a board or member 3, such as is generally used for mounting control parts, is a controlling device comprising a handle member 4 carried by a ball 5 which is mounted for universal movement in a ball socket. Ball 5 is rigidly connected with an operating member 7, formed for example as a cross and having several arms connected for operation of four flexible devices 8, 9, 10 and 11, said flexible devices preferably consisting of the inner or sliding members of Bowden wires, each of said flexible members being for example a steel wire mounted to slide longitudinally in the outer casing or tubular member 13 of the Bowden wire, said outer casing being in the form of helically wound wire adapted to bend to the required extent for forming a curved guide for the inner wire. The casings of the several Bowden wires are passed through or under the hood to the forward end of the machine in any suitable manner, said casing for example passing at either side of the engine within the hood, and such portions of the casing within the hood may be protected by an outer sheathing or tube 14 of brass or other sufficiently flexible material. The rear end of each Bowden wire 8, 9, etc., is preferably guided by a sliding sleeve 15 which is mounted to slide on the rear end of the tubular casing 14 aforesaid, said sliding sleeve being connected to the Bowden wire by set screw 16, and the connection between the said Bowden wire and the operating member 7 is preferably by means of a link member 18 having a ball and socket connection 19 with the operating member 7 and a ball and socket connection 20 with the sleeve 15 aforesaid. Any other suitable connection between the operating member 7 and the Bowden wire may however be employed. In order to provide for a smooth frictional action for the ball 5 in its socket, said socket may be made with a fixed base member 22 and a movable cap member 23 secured to the base member by screws 24, springs 25 being provided between the heads of said screws and the member 23 so as to hold said member 23 resiliently toward the base member 22, thereby causing frictional engagement of said members with the ball 5.

The lamps or headlights are mounted at the forward end of the machine on universal supports providing for rotation in both horizontal and vertical planes. For this purpose, each headlight, indicated at 27, is mounted by pivots 28 on the fork 29 so as to turn in a vertical plane on said fork and said fork is provided with a vertical shaft 30 mounted to turn on a vertical axis on a standard 31, said standard having for example an upper ball bearing 32 and a lower ball bearing 33 for said shaft. Said shaft 30 has a vertical bore 34 through which passes casing 13 of one of the Bowden wires above referred to, the inner member of said Bowden wire being connected to the lamp or headlight 27 to turn the same in a vertical plane. For the lamp on one side of the vehicle, this operating wire, for example the wire 10 is connected to the headlight 27 forwardly of the pivot thereof as shown at 37 in Fig. 1. For the lamp on the other side of the vehicle the operating wire, indicated at 8, is connected to the lamp rearwardly of its pivot, as indicated at 38 in Fig. 2. The lower end of shaft 30 for each headlight carries an arm 39 which is pivotally connected to one of the other operating wires 9 or 11. The connections are preferably such that the operating wires 8 and 10 which are above and below the center of the ball 5, and are moved respectively forwardly and backwardly on tilting operating member 4 in the vertical plane, are connected to the respective headlights for turning the same in the vertical plane on the pivots 28 thereof and the operating wires 9 and 11, which are at either side of the center of the operating ball 5, are connected respectively to the arms 39 on the respective shafts 30 for the two headlights so as to turn from side to side by movement of the operating member 4 in the horizontal plane, or from side to side. From the above it will be seen that the two wires 9 and 10 serve to operate the headlight 27 on the near side of the machine in Fig. 1, these two wires by reason of their operation both by pulling and pushing serving for all four directions of movement of the headlight; namely, forward and back, in the vertical plane and to one or the other side in the horizontal plane. Similarly the two wires 8 and 11 serve for all four operations required for the headlight on the far side of the machine in Fig. 1, this headlight being shown in Fig. 2.

The operation is as follows: In case the operator wishes to turn the headlights so as to throw the light down on the roadway, he will turn handle 4 upwardly, thereby drawing wire 10 backwardly and pushing wire 8 forwardly, and said wires, being reversely connected to the respective headlights, operate through their connections 37 and 38, to tip the headlights forward. If it is desired to turn the headlights to either side, the handle 4 is turned toward the other side, and the wires 9 and 11 will then operate through arms 38 to turn the headlights as required. In any case the motion to be given the operating handle is the same as if it were attached directly to the back of the headlight, so correct operation of same is intuitive.

The casings 13 for the Bowden wires serve to guide the flexible operating wires so as to enable the same to operate in both directions by pushing as well as pulling. Said casings are of sufficient flexibility to enable them to be bent so as to pass through the hood and around the various parts of the apparatus in such manner as to provide for transmitting the motion from the operating member or handle to the headlights in the most simple and effective manner.

What we claim is:

1. In combination with a vehicle headlight mounted to turn vertically and horizontally, a controlling member mounted to turn vertically and horizontally, a flexible wire connected to said operating member and to said headlight to turn said headlight horizontally in motion of said controlling member horizontally, a flexible wire connected to said operating member and to said headlight to turn the headlight vertically in motion of said operating member vertically and a tubular flexible casing for guiding said flexible wire to enable same to transmit pushing as well as pulling motion to enable turning of the headlight horizontally in either direction and vertically in either direction by means of said two wires.

2. In combination with two vehicle headlight supports mounted to turn horizontally, headlights mounted to turn vertically on the respective supports, a controlling handle, a universal ball and socket support for said handle, a member rigidly connected to said handle and four flexible members connected to said last named member at different points around the center of motion of said member on the ball and socket support so that motion of said handle in cne plane will operate two of said flexible members in reverse directions and operation of said handle in another plane will operate the other two of said flexible members in reverse directions, and guiding casing inclosing said flexible members to enable same to transmit pushing as well as pulling motions, two of said flexible members being reversely connected to the respective headlight supports so as to turn said headlights horizontally in unison on motion of said operating handle in one plane and the other two of said flexible members being reversely connected to the respective headlights to turn the same vertically in unison on motion of the operating handle in another plane.

In testimony whereof we have hereunto set our hands, at Palo Alto, California, this 7th day of May, 1917.

EDWARD JESURUN.
ROWLAND LYTTLE.